April 25, 1961

H. M. CLARK ET AL 2,981,067

FLOW REGULATOR

Filed July 6, 1959

Inventors
Hubert M. Clark
William T. Livermore

United States Patent Office 2,981,067
Patented Apr. 25, 1961

2,981,067

FLOW REGULATOR

Hubert M. Clark, Bloomfield Township, Oakland County, Mich., and William T. Livermore, Phoenix, Ariz.; said Clark assignor to Thompson Ramo Wooldridge Inc., a corporation of Ohio Filed July 6, 1959, Ser. No. 825,317

8 Claims. (Cl. 60—52)

This invention relates generally to flow regulating means and more particularly relates to a hydraulic system of particular applicability to hydraulically assisted power means such as a power steering system wherein it is desirable to reduce the flow of the hydraulic medium under certain conditions of operation.

In power assisted system such as the power steering system, it is desirable to reduce the flow of oil in the system at high speed, at which time the steering effort is small and the heat rise due to excessive flow is high.

In accordance with the principles of the present invention, there is provided a flow control means wherein discharge fluid from a pump is supplied to a flow passage leading to a point of utilization. A spool type valve controls the by-pasing of fluid directly between the pump outlet and the pump inlet. The spool valve includes front motive surfaces subject to fluid and discharge pressure and rear motive surfaces which together with a valve body form a pressure chamber. The flow regulator means of the present invention further include orifice forming means providing a first orifice in the flow passage through which the stream of fluid discharged by the pump is directed to the point of utilization and a second orifice which communicates the pressure chamber to the flow passage downstream of the first orifice. Thus, the spool valve operates to by-pass all excess pump discharge and maintains a constant flow in the flow passage regardless of pump speed. Moreover, as pump speed is increased, the discharge is also increased, thereby producing a further opening movement of the spool valve so that the positioning of the valve is a function of pump speed.

It is further contemplated by the present invention to supply an additional port which is controlled by the spool valve to vent the pressure chamber whenever the spool valve is moved to shifted position, thereby assisting in moving the valve towards an open position which, in turn, results in more of the pump discharge being by-passed and the flow through the flow passage to the ponit of utilization being further reduced.

It is an object of the present invention, therefore, to provide improved flow regulating means which will reduce the flow of oil in a hydraulic system under predetermined conditions of operation.

Another object of the present invention is to provide flow regulating means wherein flow of a working medium will be reduced to minimize heat rise.

Yet another object of the present invention is to provide an improved power steering system or other power assisted hydraulic circuit.

Yet another object of the present invention is to provide an improved pump and flow regulator combination.

Many other features, advantages and additional objects of the present invention will become manifest to those versed in the art upon making reference to the detailed description which follows and the accompanying sheet of drawings in which a preferred structural embodiment of an appartus incorporating the principles of the present invention is shown by way of illustrative example.

Figure 1:
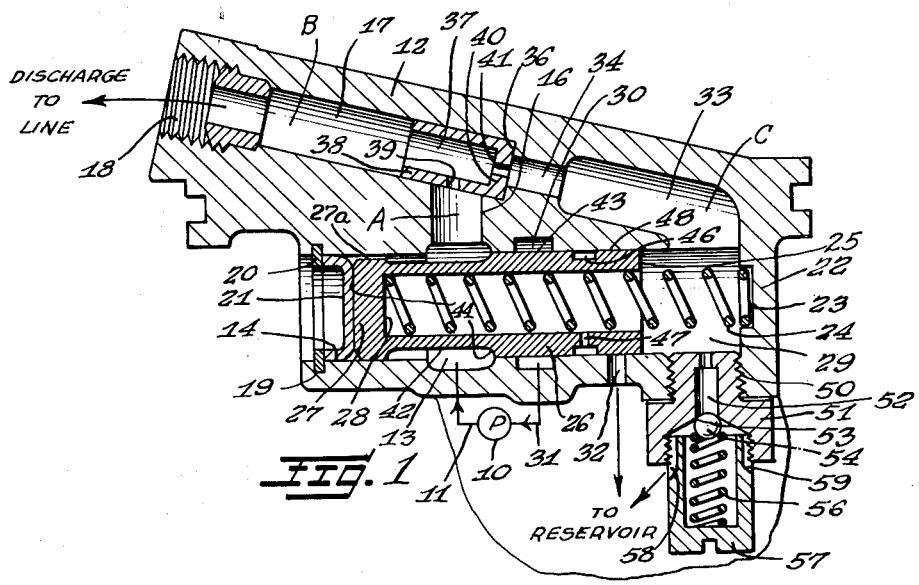
Figure 1 is a fragmentary cross-sectional view of a flow regulator incorporating the principles of the present invention and showing the components of the regulator in a first position.

The present invention is of general applicability to any power assisted mechanism utilizing a hydraulic circut wherein constant flow is desired, however, the principles of the present invention find a particularly useful applicability in a power steering system for a vehicle and, accordingly, the embodiment described herein will be referred to in connection with a power steering system.

In a typical power steering system, there is provided a hydraulic circuit through which a stream of pressurized fluid such as oil is driven. In the arrangement illustrated herein, the hydraulic circuit includes a pump 10 discharging through an outlet 11 into a flow passageway formed by a valve body 12. In the particular embodiment illustrated, the valve body 12 may comprise an appendage or boss to a pump structure or may constitute a separate element but in any event, the valve body is formed to provide a cored annular passage 13 constituting a relieved peripheral recess along the length of a valve bore or passage identified at 14.

Opening off of the recess 13 is a further extension of the flow passage shown in the orientation of the drawings as a vertical leg 16 and intersecting a leg extending somewhat horizontally and shown generally at 17.

The flow passage 13, 16, 17, is provided with a tapped opening 18 forming an outlet adapted to be connected to the line leading to a point of utilization such as the power assisting mechanism of a power steering system.

The valve passage is formed with an annular recess 19 receiving a snap ring 20 for bottoming a closure cap 21, thereby to close one end of the valve passage 14.

At the opposite end of the valve passage 14, the valve body 12 is formed with an end wall 22 having a recess 23 formed therein to seat one end of a coil spring 24.

A spool valve member 26 is slidably mounted in the valve passage 14 and includes a head portion 27 against which the opposite end of the coil spring 24 engages to continuously bias the spool valve member 26 towards the closure cap 21 with a predetermined continuous biasing force. The surface of the head portion 27 bottoming the coil spring 24 constitutes a radial wall 28 which together with an end surface 25 forms a back motive surface on the spool valve member 26 and forms together with the valve body 12 a pressure chamber 29.

The valve body 12 is further provided with an annular bypass recess 30 connected as at 31 to the inlet of the pump 10.

An additional port 32 is formed in the valve body 12, intersecting the valve passage 14 at one end thereof and leading to a reservoir in the hydraulic circuit adapted to be at ambient pressure and adapted to communicate with the inlet of the pump 10.

Extending upwardly from the pressure chamber 29 is an extension thereof formed in the valve body 12, which extension is indicated at 33. A passage of reduced size indicated at 34 is provided between the extension 33 and the flow passage 17, thereby to form a shoulder 36 seating a generally cylindrically shaped orifice forming means 37.

The orifice forming means 37 has a cylindrical wall 38 particularly characterized by the formation therein of an orifice 39 through which is directed a stream of pressurized fluid from the recess 13 and the leg 16 of the flow passage 17.

The orifice forming means 37 is further characterized by an end wall 40 having formed therein an orifice 41 communicating the flow passage 17 downstream of the orifice 39 with the pressure chamber 29 through the extension 33 and the reduced passage 34.

By virtue of the structure thus provided, there are three separate zones in the flow regulating device, namely, the zone A at full discharge pressure receiving the discharge from the pump 10 and extending in the flow passage up to the orifice 39; zone B downstream of the orifice 39 and leading to the point of utilization, and zone C constituting the pressure chamber 29.

The outer peripheral surface of the spool valve 26 is particularly characterized by the formation therein of an annular reduced section forming a recess 42 and a land 43, thereby providing a radial front motive surface indicated generally at 44 subject to discharge pressure in the recess 13 and acting on the spool valve member 26 to pressure load the spool valve member 26 against the bias of the spring 24. The recess 42 has a radial "motive surface" at each end of it. They are both subject to substantially the same pressure, but in opposite directions, and tend to counteract each other. This same fluid pressure is transmitted by means of a flat 27a on the side of the head 27 of valve 26 to the space between the valve and closure cap 21. The whole left end of valve 26 is, therefore, the "front motive surface."

The flow of hydraulic fluid from the pump outlet 11 through the flow control orifice 39 creates a pressure differential between zone A, the flow passage upstream of the orifice 39, and zone B, the flow passage downstream of the orifice 39. Since zone C communicates with zone B through the orifice 41, there will also be a pressure differential between zone A and zone C.

When the pressure acting on the front motive surface 44 becomes sufficiently high to overcome the combined continuous biasing force exerted by the spring 24 and the pressures in the pressure chamber 29, the spool valve member 26 will be moved to the right, using the orientation of the drawings, thereby shifting the recess 42 to a registered position bridging the recess 13 and the recess 30 and directly interconnecting the pump outlet 11 and the pump inlet 31.

Thus, all excess pump discharge is by-passed and a constant flow is maintained in the line regardless of the speed of the pump 10.

As the pump's speed is increased, the discharge of the pump 10 through the outlet 11 is also increased, requiring the spool valve member 26 to move further to the right. Therefore, the position of the spool valve member 26 is a function of pump speed.

In accordance with the principles of the present invention, the spool valve member 26 is further provided with an annular peripheral recess 46 communicating with the pressure chamber 29 through one or more openings 47, the recess 46 being located between the land 43 and a second land spaced therefrom indicated at 48. Thus, when the spool valve member 26 is moved to a predeterminable shifted position, the recess 46 and the opening 47 will be aligned in register with the port 32 so that the pressure chamber 29 will be vented to the reservoir which is at lower pressure than the pressure chamber 29. When such venting occurs, the pressure in zone C will be further reduced below the pressure in zone A and the resulting pressure differential will cause the valve member 26 to be biased even further to the right, whereupon more pump discharge will be by-passed and the flow in the flow passage 17 further reduced.

Figure 2:
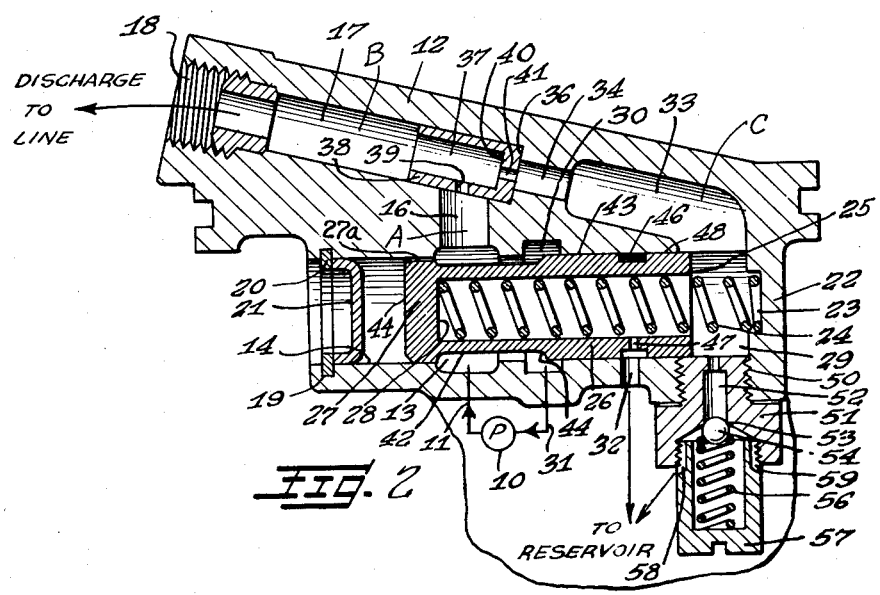
Figure 2 is a view similar to Figure 1 but showing the movable components of the inventive subject matter moved to a shifted position.

In Figure 2, the spool valve member 26 is shown in shifted position wherein the recess 42 bridges the recess 13 and the recess 30, thereby directly interconnecting the pump outlet 11 with the pump inlet 31. Also as shown in Figure 2, the recess 46 and the opening 47 are shown in register with the port 32.

The flow regulator of the present invention is also provided with pressure release means. In order to develop that function, the valve body 12 is provided with a threaded aperture 50 opening into the pressure chamber 29 and receiving in threaded relation therewith a nipple member 51 having a passage 52 formed with a valve seat 53 against which is engaged a valve member 54 such as a ball type valve member continuously biased by a coil spring 56 bottomed in a cap member 57 screw threaded as at 58 into the nipple member 51. The cap member 57 is particularly characterized by the formation of axially extending passages 59 formed through the thread portion so that opening of the valve member 54 away from the seat 53 will vent the pressure chamber 29 upon excessive pressure buildup. Since the pressure chamber 29 communicates with the flow passage 17 through the orifice 41, the hydraulic circuit will be protected against excessive pressure buildup by the safety valve arrangement thus provided.

Although minor modifications might be suggested by those versed in the art, it should be understood that we wish to embody within the scope of the patent warranted hereon all such modifications as reasonably and properly come within the scope of our contribution to the art as set forth in the following claims.

We claim as our invention:

1. A flow regulator apparatus, comprising a pump for discharging a stream of pressurized fluid, means forming a valve body having a movable spool valve therein, said valve body forming an annular discharge recess around said spool valve having an annular peripheral recess formed therein in register therewith to receive the stream of fluid discharged by said pump, said spool valve having a front motive surface at the end of said valve subject to fluid at pump discharge pressure, means forming a first orifice through which the stream of fluid is passed, said spool valve having a back motive surface means, a coil spring bottomed against said back surface means and against said valve body to bias said spool valve in one direction, said valve body having an annular bypass recess spaced axially from said discharge recess, means forming a pressure chamber behind said back motive surface of said spool valve, means forming a second orifice through which said pressure chamber communicates with said stream downstream of said first orifice, said spool valve responding to a predetermined pressure differential between said discharge recess and said pressure chamber and movable against the bias of the spring in a shifted position whereupon said spool valve recess bridges said discharge recess and bypass recess.

2. A flow regulator apparatus, comprising a pump for discharging a stream of pressurized fluid, means forming a valve body having a movable spool valve therein, said valve body forming an annular discharge recess in said spool valve having an annular peripheral recess formed therein in register therewith to receive the stream of fluid discharged by said pump, said spool valve having a front motive surface at the end of said peripheral recess subject to fluid at pump discharge pressure, means forming a first orifice through which the stream of fluid is passed, said spool valve having a back motive surface means, a coil spring bottomed against said back surface means and against said valve body to bias said spool valve in one direction, said body having an annular bypass recess spaced axially from said discharge recess, means forming a pressure chamber behind said back motive surface of said spool valve, means forming a second orifice through which said pressure chamber communicates with said stream downstream of said first orifice, said spool valve responding to a predetermined pressure differential between said discharge recess and said pressure chamber and movable against the bias of the spring in a shifted position whereupon said spool valve recess bridges said discharge recess and bypass recess, said spool valve having a separate orifice formed therein and said valve body having a passage in registered therewith when said valve is in shifted position, to vent said pressure chamber, thereby to increase the pressure differential acting on said spool valve.

3. A flow regulator comprising means forming a flow passage having an inlet receiving fluid from a pressurized source and having an outlet adapted to discharge to a point of utilization, a spool valve having a recessed peripheral surface controlling a pair of spaced ports including a first port communicating with said flow passage and a second port communicating with a zone at decreased pressure, said spool valve having a front motive surface formed thereon subject to fluid at increased pressure, means including the back of said spool valve forming a pressure chamber, and orifice forming means forming a first orifice in said flow passage between said inlet and said outlet and a second orifice connecting said pressure chamber with said flow passage between said outlet and said first orifice whereupon said spool valve will move to shifted position to interconnect said first and second ports as a function of the pressure differential between said inlet and said pressure chamber.

4. A flow regulator comprising means forming a flow passage having an inlet receiving fluid from a pressurized source and having an outlet adapted to discharge to a point of utilization, a spool valve having a recessed peripheral surface controlling a pair of spaced ports including a first port communicating with said flow passage and a second port communicating with a zone at decreased pressure, said spool valve having a front motive surface formed thereon subject to fluid at increased pressure, means including the back of said spool valve forming a pressure chamber, and orifice forming means forming a first orifice in said flow passage between said inlet and said outlet and a second orifice connecting said pressure chamber with said flow passage between said outlet and said first orifice whereupon said spool valve will move to shifted position to interconnect said first and second ports as a function of the pressure differential between said inlet and said pressure chamber, said spool valve controlling a third port to vent said pressure chamber to a zone of lower pressure when the spool valve is moved to shifted position, thereby to increase the pressure differential acting on said spool valve.

5. In a power steering system, a pump having an inlet and an outlet, a valve body having formed therein a flow passage receiving a stream of fluid discharged by said pump from said outlet, a spool valve having a peripheral surface formed to control a pair of spaced ports in said valve body including a first port communicating with said flow passage and a second port communicating with said inlet, said spool valve having a front motive surface subject to fluid discharged by said pump and a rear motive surface forming together with said valve body a pressure chamber, orifice forming means forming a first orifice in said flow passage through which said stream of fluid is directed and forming a second orifice communicating said pressure chamber with said flow passage downstream of said first orifice, continuous biasing means preloading said spool valve to a normally closed position whereupon said stream of fluid is directed through said first orifice, said spool valve being movable to a shifted open position in response to excess pump discharge to directly interconnect the pump outlet and inlet.

6. In a power steering system, a pump having an inlet and an outlet, a valve body having formed therein a flow passage receiving a stream of fluid discharged by said pump from said outlet, a spool valve having a peripheral surface formed to control a pair of spaced ports in said valve body including a first port communicating with said flow passage and a second port communicating with said inlet, said spool valve having a front motive surface subject to fluid discharged by said pump and a rear motive surface forming together with said valve body a pressure chamber, orifice forming means forming a first orifice in said flow passage through which said stream of fluid is directed and forming a second orifice communicating said pressure chamber with said flow passage downstream of said first orifice, continuous biasing means preloading said spool valve to a normally closed position whereupon said stream of fluid is directed through said first orifice, said spool valve being movable to a shifted open position in response to excess pump discharge to directly interconnect the pump outlet and inlet, said spool valve controlling a venting port in said valve body to vent said pressure chamber, whenever said spool valve is moved to shifted position, thereby to increasingly open the spool valve.

7. In a power steering system, a pump having an inlet and an outlet, a valve body having formed therein a flow passage receiving a stream of fluid discharged by said pump from said outlet, a spool valve having a peripheral surface formed to control a pair of spaced ports in said valve body including a first port communicating with said flow passage and a second port communicating with said inlet, said spool valve having a front motive surface subject to fluid discharged by said pump and a rear motive surface forming together with said valve body a pressure chamber, orifice forming means forming a first orifice in said flow passage through which said stream of fluid is directed and forming a second orifice communicating said pressure chamber with said flow passage downstream of said first orifice, continuous biasing means preloading said spool valve to a normally closed position whereupon said stream of fluid is directed through said first orifice, said spool valve being movable to a shifted open position in response to excess pump discharge to directly interconnect the pump outlet and inlet, said spool valve controlling a venting port in said valve body to vent said pressure chamber, whenever said spool valve is moved to shifted position, thereby to increasingly open the spool valve, and means forming a separate preloaded relief valve in said pressure chamber to vent said chamber upon excessive pressure build up.

8. Apparatus for controlling flow in a hydraulic circuit of a power assisting apparatus, comprising means for driving fluid through a liquid circuit including pressurizing means for acting on the fluid at one point in the circuit to drive a stream of fluid at increased pressure through the circuit, means forming an orifice at a second point in the circuit for flowing all of the pressurized fluid in said stream through the orifice and to produce a first zone in said circuit at a first pressure on the upstream side of said orifice and a second zone in said circuit at a second pressure on the downstream side of said orifice, conduit means for flowing all of the stream from said second zone to a point of utilization, for returning spent fluid in the stream from the point of utilization to said one point in said circuit for recycling the fluid through said circuit, and for communicating fluid from said stream at said second zone to a third zone out of said stream, pressure responsive control means selectively bypassing fluid from said first zone to said one point in the circuit as a function of the pressure differential between said first zone and said third zone, and means operable concurrently with said bypassing control means for flowing the fluid out of said third zone to said stream at said one point in the circuit to increase the pressure differential between said first and third zone.

References Cited in the file of this patent

UNITED STATES PATENTS 2,733,662    Hunter               Feb. 7, 1956
2,742,862    Banker              Apr. 24, 1956